United States Patent
Koseoglu (10) Patent No.: US 11,260,356 B2
(45) Date of Patent: Mar. 1, 2022

(54) CATALYST TESTING PROCESS AND APPARATUS

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 142 days.

(21) Appl. No.: 16/741,323

(22) Filed: Jan. 13, 2020

(65) Prior Publication Data

US 2021/0213407 A1 Jul. 15, 2021

(51) Int. Cl.
| | |
|---|---|
| *B01J 8/00* | (2006.01) |
| *B01J 8/02* | (2006.01) |
| *B01J 19/00* | (2006.01) |
| *B01J 19/24* | (2006.01) |
| *B01J 8/16* | (2006.01) |

(52) U.S. Cl.
CPC .............. *B01J 8/008* (2013.01); *B01J 8/0257* (2013.01); *B01J 8/16* (2013.01); *B01J 2208/00044* (2013.01); *B01J 2208/00884* (2013.01)

(58) Field of Classification Search
CPC ... B01J 8/008; B01J 8/02; B01J 8/0242; B01J 8/025; B01J 8/0257; B01J 8/16; B01J 19/00; B01J 19/24; B01J 2208/00; B01J 2208/00008; B01J 2208/00017; B01J 2208/00026; B01J 2208/00035; B01J 2208/00044; B01J 2208/00061; B01J 2208/00654; B01J 2208/00796; B01J 2208/00805; B01J 2208/00814; B01J 2208/00884; B01J 2219/00; B01J 2219/00002; B01J 2219/00004; B01J 2219/00015; G01N 31/00; G01N 31/10
See application file for complete search history.

(56) References Cited

U.S. PATENT DOCUMENTS

| | | |
|---|---|---|
| 4,683,121 A | 7/1987 | Goudriaan et al. |
| 7,314,603 B2 * | 1/2008 | Filippi .................. B01J 8/0035 422/198 |
| D768,844 S | 10/2016 | Koseoglu et al. |
| 9,463,427 B1 | 10/2016 | Koseoglu et al. |

(Continued)

OTHER PUBLICATIONS

Weissman, J. G et al., "Characterization and aging of hydrotreating catalysts exposed to industrial processing conditions." Applied Catalysis A: General 142.2 (1996): 289-314.

(Continued)

*Primary Examiner* — Natasha E Young
(74) *Attorney, Agent, or Firm* — Leason Ellis LLP (57) ABSTRACT

A method for analyzing a catalyst in a catalytic reactor that operates under non-isothermal conditions includes the steps of: positioning a catalyst basket within a catalyst bed within the catalytic reactor, the catalyst basket containing catalyst material the forms the catalyst bed; operating the catalytic reactor, the catalyst basket having dimensions such that a temperature difference ($\Delta T$) along an axial direction (height) of the catalyst basket is non-isothermal; and analyzing the catalyst material contained within the catalyst basket. The temperature difference ($\Delta T$) is, in one embodiment, within a range of 1° C. to 40° C. and preferably, within a range of 5° C. to 25° C.

15 Claims, 4 Drawing Sheets

(56) References Cited

U.S. PATENT DOCUMENTS

2004/0018124 A1    1/2004  Filippi et al.
2008/0009408 A1    1/2008  Birke et al.
2017/0128901 A1    5/2017  Maas et al.

OTHER PUBLICATIONS

International Search Report and Written Opinion in Corresponding PCT Application No. PCT/US2021/012620 dated May 4, 2021. 14 pages.

Marafi et al. "Spent catalyst waste management: A review: Part 1—Developments in hydroprocessing catalyst waste reduction and use." Resources, Conservation and Recycling 52.6 (2008): 859-873.

\* cited by examiner

CATALYST TESTING PROCESS AND APPARATUS

TECHNICAL FIELD

The present disclosure relates generally to catalyst testing and more particularly, to catalyst testing processes and apparatuses for testing the performance and/or evolution over time of at least one catalyst.

BACKGROUND

The petroleum refining art employs many different systems and chemical processes that require the use of one more catalyst, such as a catalyst that is used in a reactor, such as a fixed bed reactor. It is also well known in the petroleum refining art to carry out catalyst testing processes for the discovery and optimization of the catalysts, for example by screening the activity, selectivity, or deactivation behavior of catalysts, etc. For example, catalyst performance testing can include testing one or more of the following parameters: activity; selectivity; longevity; physical property testing; regeneration cycle testing; coking/fouling testing, etc.

Catalyst testing is conventionally accomplished in bench scale or larger pilot plants in which the feed is contacted with a catalyst under reaction conditions, generally with effluent products being sampled, often with samples being analyzed and results subjected to data resolution techniques. Such procedures can take a day or more for a single run on a single catalyst. Catalyst testing can cover several types of research such as catalyst effectiveness, yield, activation, lifetime and regeneration. It will also be understood that different reaction conditions can be employed during the catalyst testing including but not limited to different pressures, temperatures, reagents, and flow rates.

There are many different types of suitable catalytic reactors in which the catalyst(s) is tested. For example, fixed bed reactors and circulating fluidized reactors are two types of catalytic reactors. The catalytic reactor can include one or more baskets to hold the catalyst and the type of catalyst baskets varies depending on the catalyst being used, the interaction with the chemistry, the temperature, the pressure and the number of catalysts in the basket. Exposure to the reactants can be done through a stationary catalyst bed or a spinning basket.

Catalyst Evaluation

A common use of catalytic reactors is for the evaluation or "screening" of catalysts. Often this involves testing tens or hundreds of catalysts with very similar formulations and simply comparing their activity and/or selectivity towards a particular reaction. For such cases it is only necessary that the information obtained represent true trends in the behavior of these catalysts and fairly simple laboratory reactors may be suitable.

For these types of catalyst studies, small fixed-bed reactors are typically chosen. Fixed-bed reactors are simple to fabricate, can be satisfactorily operated with only a small amount of catalyst (an important criterion if one is synthesizing only laboratory quantities of catalyst), and with proper choice of operating conditions can be run isothermally and with a minimum of transport effects. These fixed-bed reactors can be operated in either a differential or integral mode. However, for meaningful comparisons among the catalysts being tested, the overall conversion should be kept low so that differences in catalytic activity become readily apparent.

Another type of reactor is a pulse-type fixed-bed reactor in which the reactants are periodically pulsed over a catalyst bed otherwise maintained in an inert gas flow.

Determination of Intrinsic Kinetic Data

When choosing a laboratory-scale catalytic reactor to obtain intrinsic kinetic data, one is concerned with operating with minimal heat and mass gradients so that the information obtained accurately reflects the true chemistry of the reaction and that it is not affected by transport effects. Thus, a reactor type should be chosen which has a well-defined analytical solution to the kinetic equations that are of interest.

Determination of Process Parameters for Scale-Up

In addition to obtaining intrinsic kinetic data, it is sometimes necessary to operate a reactor so as to mimic as close as possible the behavior of a large-scale reactor. In these types of applications, designing a reactor having a distribution of phases which approximate those in the large-scale reactor of interest is desired, as well as having dimensions and parameters which correspond to the size of the large-scale reactor. Thus, the type of laboratory reactor used should be of the same type as the large reactor. Additionally, it should be operated under conditions of temperature, pressure, reactant concentrations, and catalyst shape which are substantially the same as will be used in the larger reactor.

SUMMARY

In one embodiment, a method for analyzing a catalyst in a catalytic reactor that operates under non-isothermal conditions comprises the steps of:

positioning a catalyst basket within a catalyst bed within the catalytic reactor, the catalyst basket containing catalyst material the forms the catalyst bed, operating the catalytic reactor, the catalyst basket having dimensions such that a temperature difference ($\Delta T$) along an axial direction of the catalyst basket is non-isothermal; and analyzing the catalyst material contained within the catalyst basket.

In one embodiment, the temperature difference ($\Delta T$) is within a range of 1° C. to 40° C. and preferably, within a range of 5° C. to 25° C.

Figure 1:
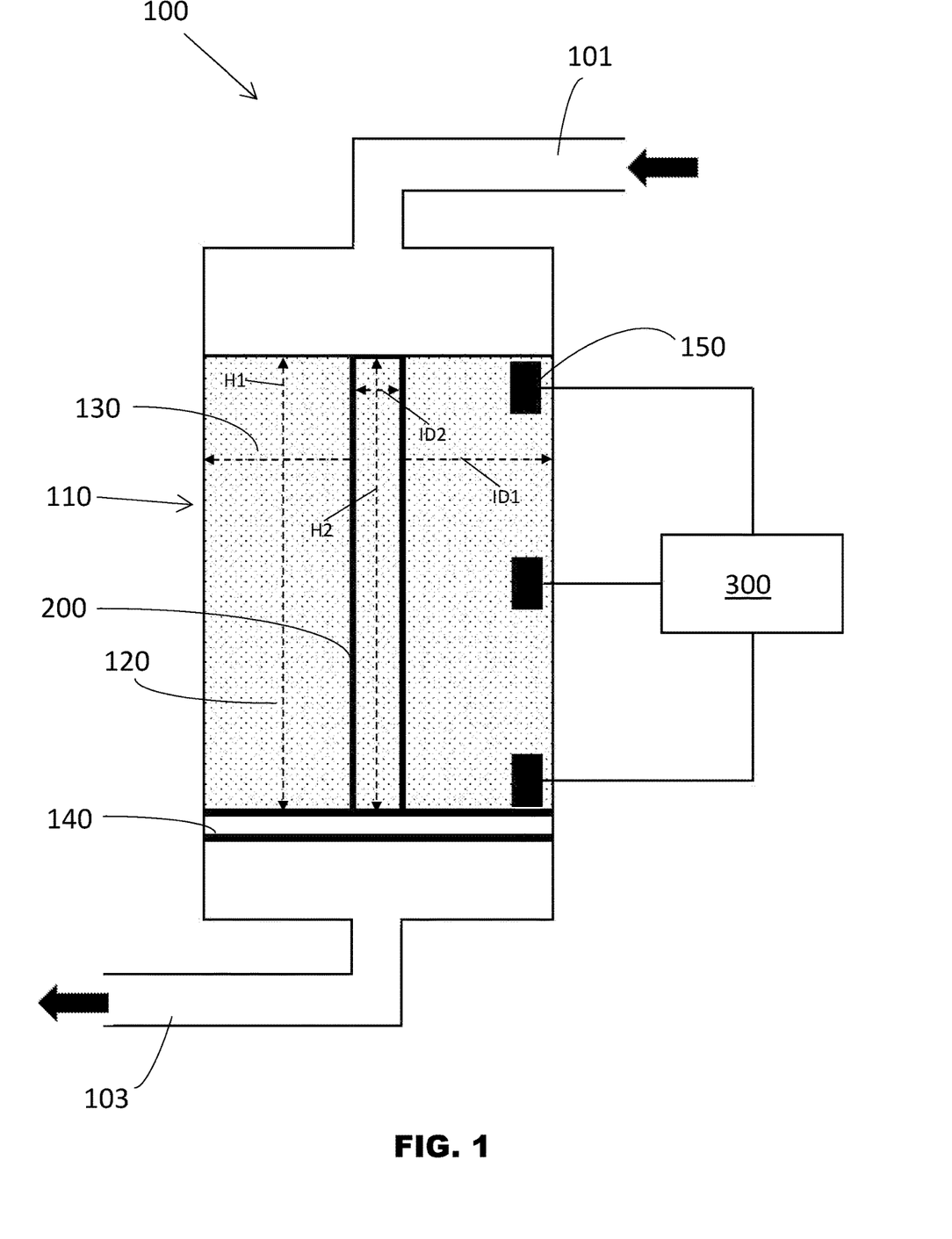
FIG. 1 is a schematic illustrating an exemplary catalytic reactor with a catalyst basket according to the present disclosure.

In another aspect of the present disclosure and as shown in FIG. 1, a catalytic reactor includes a housing and a catalyst bed disposed within the housing in a catalyst reaction zone. The catalyst bed has a height (h1) and an internal diameter (ID1). The reactor also includes a catalyst basket disposed within the catalyst bed, with the catalyst basket having a height (h2) and an internal diameter (ID2). In one embodiment, h2/ID2 is between 1 and 300. In one embodiment, the catalyst basket has an internal diameter of between about 1 cm to 25 cm, a height between 25 cm to 300 cm, and a wall thickness between 0.1 cm and 1 cm. The catalytic reactor comprises one of a hydrodesulfurization reactor, a hydronitrogenation reactor, hydrocracking reactor, a hydrogenation reactor and a hydrometallization reactor.

DETAILED DESCRIPTION OF CERTAIN EMBODIMENTS

As discussed herein, the present disclosure is directed to catalyst testing and more particularly, to catalyst testing processes and apparatuses. The efficiency (or performances) of a fixed bed catalyst depends on the operating conditions (in particular temperature, pressure and liquid hourly space velocity LHSV) and can be measured according to several criteria: the conversion obtained for a given charge under given operating conditions, the selectivity of this conversion, in particular vis-à-vis one or more sought after products, and more generally the spectrum of products obtained. The efficiency and the performance over time of a catalyst are generally not constant. Apart from possibly during an initial phase of initiation and start-up where the catalyst can sometimes have an increasing activity, there is generally a certain deactivation of the catalyst over time, which can be manifested by a loss of activity and/or selectivity, continuous or substantially asymptotic or according to other modes of catalytic behavior. This evolution over time of a catalyst can result from multiple factors that can possibly be combined. For example, coking, which is the deposition of other impurities, can clog the pores of the catalyst, reduce its surface area and/or cause diffusional limitations can be cited in particular. A catalyst can also lose active sites by different mechanisms, for example catalyst poisons, reversible or not, and/or see its structure evolve, for example by falling porosity and/or the surface of the support.

The performance of a catalyst also depends on the nature of the charge, the presence of impurities and/or inhibiting compounds. Catalyst manufacturers therefore have to carry out catalyst tests at the laboratory, at different dimensional scales, for example on micro pilots, or on larger pilot sizes depending on the type(s) of catalysts being tested. It is also necessary to test different charges, with different operating conditions, comparative tests of several different catalysts, long-term tests to assess the evolution over time of the catalyst and its performance etc. All tests are particularly expensive both in investment, energy consumption and loads etc. They are carried out on test facilities, or "pilot plants", some performing the test of a single catalyst, and others testing several catalysts generally operating in parallel. The effluent analysis of the pilot plant is typically carried out, and often the analysis of the catalyst is carried out after a desired period of operation. These chemical analyzes constitute a vast field well known to those skilled in the an. A large number of chemical analysis techniques are commonly used in laboratories, such as elemental (CHSN) analysis, density, gas chromatography (GC) or liquid chromatography (LC) analysis. IR (infrared) spectroscopy. MS (mass spectroscopy), NMR (magnetic resonance) nuclear), "X-ray fluorescence", "UV fluorescence", ICP ("inductively coupled plasma"), AA (atomic absorption), ATD-ATG (thermo-differential/thermo-gravimetric analysis), observation under the electron microscope, the measurement of the BET surface of the catalyst, etc. These techniques are readily understood by those skilled in the art.

Hydroprocessing

As is readily understood in the industry, the products of petroleum refining must meet tight specifications, including limits on sulfur, nitrogen, olefins, aromatics, and other contaminants. Hydrotreating removes these contaminants from distilled crude oil fractions and intermediate process streams, while hydrocracking converts heavy oil fractions into lighter, more valuable products. Hydrotreating and hydrocracking processes share many common features, so they often are discussed together as "hydroprocessing." Most hydroprocessing reactors employ specialized catalysts. As the name implies, they all consume hydrogen during the reactions that take place in the reactors.

The reactions within the catalytic reactors can be thermodynamically defined. As is known, thermodynamics is a branch of physics that concentrates on changes of energy (heat) in the properties of a system during any physical or chemical reaction.

Isothermal Process

Isothermal refers to a process in which a system changes-whether it be the pressure, volume and/or contents-without the temperature changing. From the point of view of the first law of thermodynamics, this means that the internal energy of the system is unchanged, since temperature is a measure of the average kinetic energy of molecules within the system. Thus, something in the system works to maintain that equal temperature.

In physics, charting such reactions and processes is done using diagrams (graphs). In a phase diagram, an isothermal process is charted by following a vertical line (or plane, in a 3D phase diagram) along a constant temperature. The pressure and volume can change in order to maintain the temperature of the system.

Non-Isothermal Process

Non-isothermal reactors are readily used in industrial applications. The chemical reactions depend on temperature, either absorbing (endothermic) or generating (exothermic) a large amount of heat. Industrial reactors often operate under the non-isothermal conditions. In such conditions, the temperature and the composition vary from point to point. Either a heating/cooling coil or an external heat exchanger can affect the temperature. Some reaction rates double for a rise in temperature of 10-15° C., and temperature affects the properties of the reaction mixture such as the density, specific heat, thermal conductivity and viscosity, enthalpy, mixing patterns, and the energy for efficient mixing. Temperature coefficients are not as great as for the rate constant; therefore, averaged values of the physical properties are often used for design purposes. Some reactors operate under adiabatic conditions, where there is negligible heat input to the reactor. The design of the non-isothermal reactors involves the simultaneous solution of both mass and energy balances. In some reactors, such as a packed bed or s fluidized catalytic cracking unit (FCCU), the momentum balance is considered with both the mass and energy balances.

Catalytic Reactor

As mentioned, and illustrated in FIG. 1, an exemplary catalytic reactor 100 includes a housing 110 that defines a reaction zone 120 in which a catalyst material 130, such as a catalytic bed, is disposed and typically supported by a support 140.

An inlet 101 is shown at one end of the housing and an outlet 103 is shown at the opposite end. As is understood in the industry, most of the fixed-bed operations are down flow therefore the liquid inlet 101 is at the top of the reactor as shown in FIG. 1. The liquid feed is thus introduced at the top inlet 101 and flows by gravity through the catalyst to the bottom outlet 103.

As will be understood by one skilled in the art, there are many different types of catalytic reactors. The sizes and shapes of the catalytic reactor 100 can thus vary. For example, the housing 110 can have a hollow cylindrical shape.

For example, in a fixed bed reactor, the catalyst (e.g., catalyst pellets) are held in place and do not move with respect to a fixed reference frame.

A fluidized bed reactor is a type of reactor device in which a fluid (gas or liquid) is passed through a solid granular material (e.g., a catalyst) at high enough velocities to suspend the solid and cause it to behave as though it were a fluid.

Catalyst Basket

As discussed herein, catalyst baskets are often used in catalytic reactors for the testing of one or more catalysts. The catalyst basket is constructed to hold one or more catalysts. FIG. 1 shows a catalyst basket at 200 and which is located within the reaction zone 120. The catalyst basket 200 generally consists of a basket or container, of an appropriate size, suitable for containing a predetermined amount of predefined catalyst and suitable to be passed through, in an axial and/or radial direction, by one or more fluids, such as reactant gases and by gaseous reaction products.

FIG. 1 illustrates one embodiment and one exemplary relationship between the catalyst basket 200 and the reaction zone 120 and catalyst bed 130. More specifically, in FIG. 1, the height of the catalyst basket 200 is about equal to the height of the catalyst bed 130. However, as described herein, this is merely one embodiment.

In one embodiment, the catalyst contained within the catalyst basket 200 can be formed as a single layer or multi layers. It will also be appreciated that one or more catalysts can be contained within the catalyst basket 200. The catalysts can also be aged in the reactor 100 and also can be recovered from the reactor 100. When recovered, the catalysts can be regenerated by combustion. Also, the recovered catalysts can be tested in a pilot plant to determine one of: catalyst selectivity, activity, and remaining life. In addition, one or both of the recovered catalysts and regenerated catalysts are analyzed for physical properties and chemical composition. For example, and as discussed herein, the metal deposition profile of the catalyst within the catalyst basket can be determined.

The reactor 100 also includes one or more thermocouples (sensors) 150. Typically, the reactor 100 will include multiple thermocouples 150 arranged within the reactor 100 and more specifically, within and along the reaction zone thereof. By using multiple robust thermocouple sensors 150, accurate temperature measurements at multiple points inside a reactor's catalyst bed provide reliable data for drawing curves that help profile how the catalyst bed will perform under given conditions. These curves are also a valuable tool by estimating the life of the catalyst bed, which is important for knowing when to replace the reactor's catalyst. Thus, in operation of catalytic reactors, such as fixed-bed catalytic reactors (which are widely used in hydrocarbon processing and in the chemical process industry), it is desirable to measure temperatures at a plurality of spaced locations in the reactor to obtain a temperature profile(s). Temperature measurements are commonly made by either moving a thermocouple 150 to various positions within the reactor 100, such as within a structure of the reactor 100, or by positioning multiple thermocouples 150 along the height of the reactor 100 (e.g., within the reactor zone). The number of thermocouples 150 will depend on the nature of the catalytic reaction, and on the inner diameter of the reactor 100.

As shown, the thermocouples 150 are typically operatively coupled and in communication with a processor that can be part of a computing device (e.g., device 300 of FIG. 1) that can include memory to store the measurements of the thermocouples 150 as well as other information obtained during the operation of the reactor 100.

Although the thermal sensors used in the specific embodiment are thermocouples, the sensors may be in the form of any component which generates a signal indicative of temperature, such as a resistance temperature detector (RTD).

Catalyst Basket for Non-Isothermal Conditions

In accordance with the present disclosure, the catalyst basket 200 is particularly suited for use in reactor 100 that operates under non-isothermal conditions. As mentioned herein, hydroprocessing reactors are non-isothermal as the heat is generated during the reaction and there is a temperature increase along the catalyst bed.

Applicant's previous catalyst baskets were particularly configured for use in isothermal conditions in that the catalyst baskets had very limited height relative to the height of the catalyst bed and in particular, these catalyst baskets were typically cylindrical in shape with low height to (inner) diameter ratio. e.g., 0.2 to 0.5. For example, in one embodiment, the height of the conventional catalyst basket can be about 25 cm and the catalytic bed can have a height of about 300 cm. Thus, it will be appreciated that one catalyst basket occupies a very small area of the catalytic bed and as such, the catalyst basket can only sample and collect data for a small temperature range of the reactor (since temperature range is typically measured along a longitudinal (vertical) axis and the small footprint of the conventional catalytic basket only allows for limited temperature sampling along the temperature axis (vertical axis) since temperature changes along this axis of the reactor.

Thus, the conventional catalyst basket was only practical for use in a reactor that operates under isothermal conditions since the temperature, by definition, is constant throughout the reactor 100 and thus, the location of the catalyst basket is not critical. The catalyst basket can be left in place for a considerable amount of time, such as up to 3 years and therefore, its location is critical since the catalyst basket is not recovered frequently.

The catalyst basket 200 is suited for non-isothermal catalyst conditions given its physical structure and in particular, its physical structure and dimensions, are selected in view of non-isothermal catalyst testing. As mentioned herein, in non-isothermal catalyst test conditions, the temperature within the reaction zone of the reactor 100 is not constant and therefore, the temperature varies along the height (longitudinal axis) of the reactor 100. The catalyst basket 200 is thus construction to allow for catalyst testing over a much greater area of the reaction zone and more particularly, the catalyst basket 200 has a high height to (inner) diameter ratio, such as between about 1 to about 300. In one embodiment, the height to (inner) diameter ratio is greater than 10, greater than 20 or greater than 50. In one embodiment, the height to (inner) diameter ratio is between about 10 to 20, between about 10 to 30, between about 10 to 40, between about 10 to 50, between about 10 to 60, between about 10 to 70, between about 10 to 80, between about 10 to 90, between about 10 to 100, between about 20 to 30, between about 20 to 40, between about 20 to 50, between about 20 to 60, between about 20 to 70, between about 20 to 80, between about 20 to 90, between about 20 to 100, between about 30 to 40, between about 30 to 50, between about 30 and 60, between about 30 and 70, between about 30 and 80, between about 30 and 90, between about 30 and 100, between 40 and 100 or between 50 and 100. It will be appreciated that these values are only exemplary in nature and not limiting of the scope of the present invention and thus, the ratio can fall outside the above ranges. In addition, the overall height of the catalyst basket 200 can be compared relative to the overall height of the catalyst bed. For example, the height of the catalyst basket 200 can be at least 5% of the overall height of the catalyst bed or it can be at least 10%, or at least 20%, or at least 30%, or at least 40%, or at least 50%, or at least 60%, or at least 70%, or at least 80%, or at least 90%, or at least 100%.

Thus, in one embodiment, a temperature difference ($\Delta T$) along an axial direction of the catalyst basket 200 is non-isothermal and for example, can be within the range of about 1° C. to about 40° C., and preferably, in one embodiment, between about 5° C. and about 25° C.

In one embodiment, the catalyst basket 200 has a minimum inner diameter of 1 cm and maximum inner diameter of 25 cm, and has a minimum height of 25 cm and a maximum height of 300 cm. This results in a height/diameter value of between 1 and 300.

Thus, in contrast to the conventional catalyst baskets, the catalyst basket 2 occupies a much greater (longitudinal) area of the catalyst bed and therefore, occupies a much greater temperature profile over the catalyst bed which makes it particularly suited for non-isothermal conditions by allowing testing of the catalyst material (within the reaction zone). Since the catalyst basket 200 occupies a much greater height, the reaction and catalyst evaluation can occur over a greater range of temperature.

Since the operator knows the dimensions (e.g., height) of the catalyst basket 200, as well as, the dimensions (e.g., height) of the catalyst bed 130, the relative location of the catalyst material within the catalyst basket 200 is known. In addition, the location of the thermocouples 150 are also known within and relative to the reaction zone and catalyst bed. Thus, the location of the temperature measurements within the catalyst bed are readily understood and therefore, the location of the temperature measurements can be related to the catalyst basket 200 (e.g., relative location between the thermocouples and catalyst basket 200). In other words, the catalyst behavior and performance can be evaluated within the reactor under non-isothermal conditions due to elongation of the catalyst basket and the catalyst basket 200 occupying a greater height of the catalyst bed 130. At the completion of the test period, the catalyst basket 200 can be removed from the catalyst bed 130 and any catalyst performance test or other types of tests can be performed on the catalyst within the catalyst basket 200 using traditional techniques and protocol.

The catalyst basket 200 can take any number of different forms including different shapes. For example, the catalyst basket 200 can have a cylindrical shape. In addition, in one embodiment, the catalyst basket 200 is constructed to hold only a single catalyst and thus, the hollow interior of the catalyst basket 20 can have a single compartment that holds the catalyst (e.g., the catalyst receiving area can be cylindrical in shape). It is possible for the catalyst basket 200 to have multiple compartments to hold different catalysts.

The catalyst basket 200 can be formed of any number of suitable materials, including metals, such as stainless steel, and can have a conventional construction, such as a mesh construction formed by wires. As mentioned, in one embodiment, the catalyst basket 20 is immersed in the catalyst bed and therefore, is surrounded by catalyst (i.e., the catalyst is disposed between the exterior of the catalyst basket and the inner wall of the reactor housing).

In one embodiment, the catalyst basket 200 has an internal diameter of between about 1 to 25 cm and the height of the basket can be between about 10 cm to about 300 cm. A wall thickness of the catalyst basket 200 can be between about 0.1 cm and 1 cm.

The thermocouples 150 can thus be arranged along the height of the catalyst basket 200 to allow for temperature monitoring at multiple locations along the height of the catalyst bed. As mentioned, this information is very important in non-isothermal conditions for testing and evaluating catalyst performance. As shown in the figures, the location of the thermocouple can be identified by nomenclature of 100 (one end of reactor/reaction zone) to 0 (other end of reactor/reaction zone).

Figure 2:
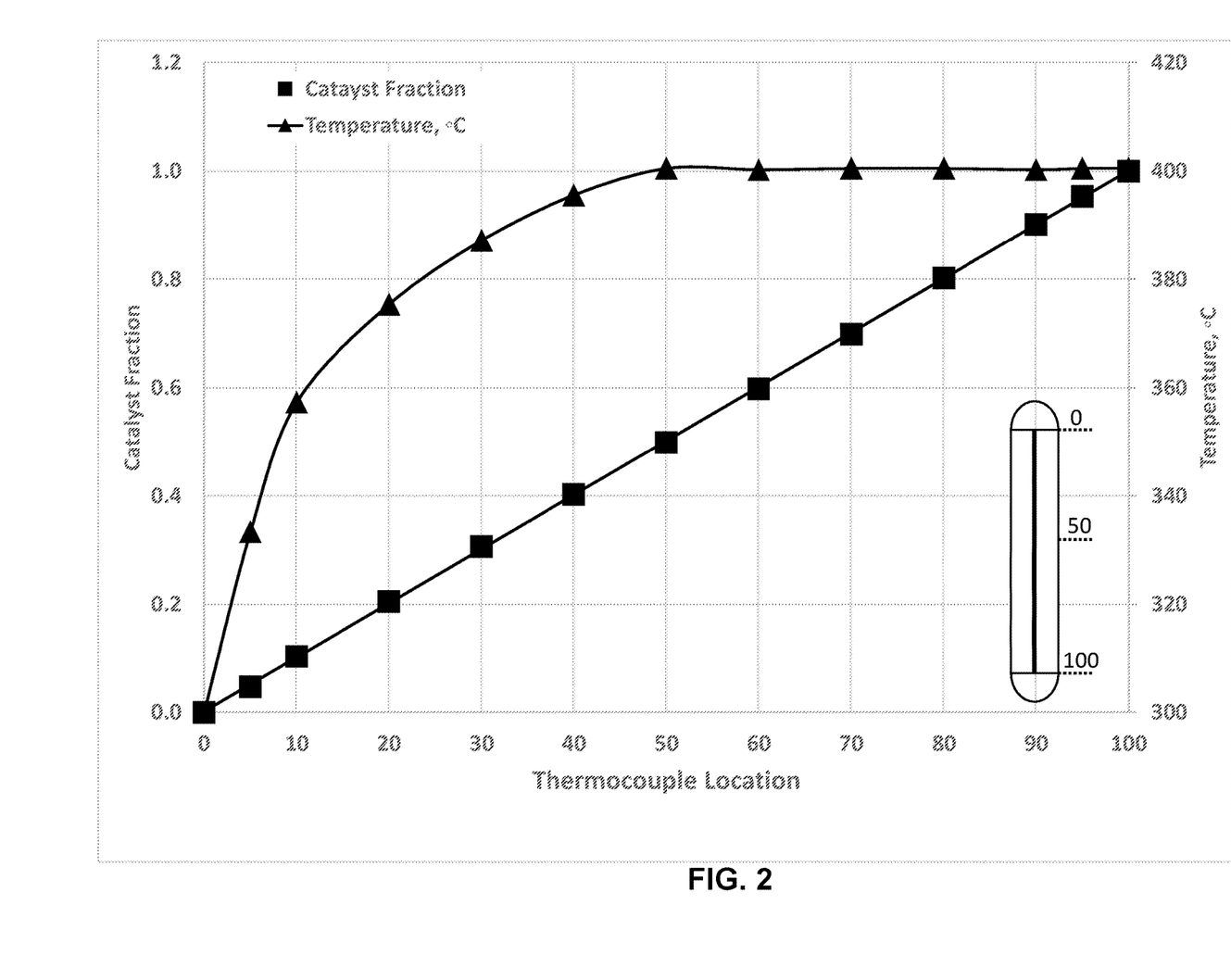
FIG. 2 is a chart shows the catalyst loading ( ---■--- ) and temperature profile ( ---▲--- ) in a reactor as a function of thermocouple location.

FIG. 2 is a chart that shows the catalyst loading and temperature profile in a reactor (e.g., reactor 100) as a function of thermocouple location. The left y-axis is labeled as catalyst fraction which is being plotted along one curve (---■---) and the right y-axis is labeled as temperature which is being plotted along another curve (---▲---). FIG. 2 also represents as a schematic the reactor and more specifically, the thermocouple location. In particular, an oblong shaped reactor is illustrated with the marking 0, 50 and 100 marking the relative location along the reactor for a thermocouple. The location identified by 101 represents the top of the reactor shown in FIG. 1 and is the location at which the fluid inlet is located and thus, contains catalyst that is first contact by the fluid that is introduced into reactor. Conversely, the location identified by 103 represents the bottom of the reactor and contains catalyst located at or close to the outlet of the reactor and therefore, represents the opposite end of the reactor zone. As shown in FIG. 2, the temperature increase with increasing percentage of active catalyst in the direction toward thermocouple location 100 from location 0 as a result of exothermicity of reaction. FIG. 2 thus illustrates the temperature increase and in particular, the temperature profile illustrates the non-isothermal nature of the reactor. As discussed herein, the illustrated reactor has only a single bed (i.e., single reactor/single bed); however, the catalyst basket described herein and the teachings of the present disclosure can be implemented in a multi-bed reactor design. If there are two or more beds, there will be a quench case that is injected to cool the effluents before they enter the second bed.

The temperature profile is thus not linear but rather is represented by an exponential curve. This is due to the exothermic nature of the reactions taking place in a hydroprocessing reactor (e.g., reactor 100). Given the non-linear temperature profile, the impact of the temperature increase on the catalyst must be tested using one or more elongated catalyst baskets 200 (e.g., long tube reactors) as opposed to Applicants previous catalyst basket which only permits the reaction at a constant temperature to be measured. Applicant's previous catalyst basket is set forth in U.S. Pat. No. 9,463,427 and U.S. design Pat. D768,844, each of which is hereby incorporated by reference in its entirety. While these baskets show multiple chambers for holding multiple catalysts, the present basket 200 is primarily intended to hold a single catalyst (which can be formed in a single or multi-layer); however, it is possible and within the scope of the present invention that an internal construction shown in the above-identified patents can be incorporated into the elongated shaped basket 200 of the present disclosure.

Hydrodemetallization

Hydrodemetallization bed or reactors are used upstream of the hydrotreating or hydrocracking reactors if the feedstock contains any metals. The hydrodemetallization beds demetallizes the feedstock over large pore catalysts designed for metal removal to prevent any metals going to the hydrotreating or hydrocracking beds/reactors containing micro pore catalysts. The metal profile is very important in designing a new catalyst system and/or reactors.

The feedstock that is typically added to the reactor contains contaminant metals, such as vanadium and nickel and these metals are deposited in the pores of the catalyst. There is more metal deposition in the catalyst particles at the top section of the catalyst basket 200 or catalyst bed and there will be less metal deposition in the catalyst particles in the bottom section of the basket. Moreover, the metal deposition across the catalyst pellet is different at the top of the catalyst basket 20 compared to that in the bottom section of the catalyst basket 200.

Figure 3:
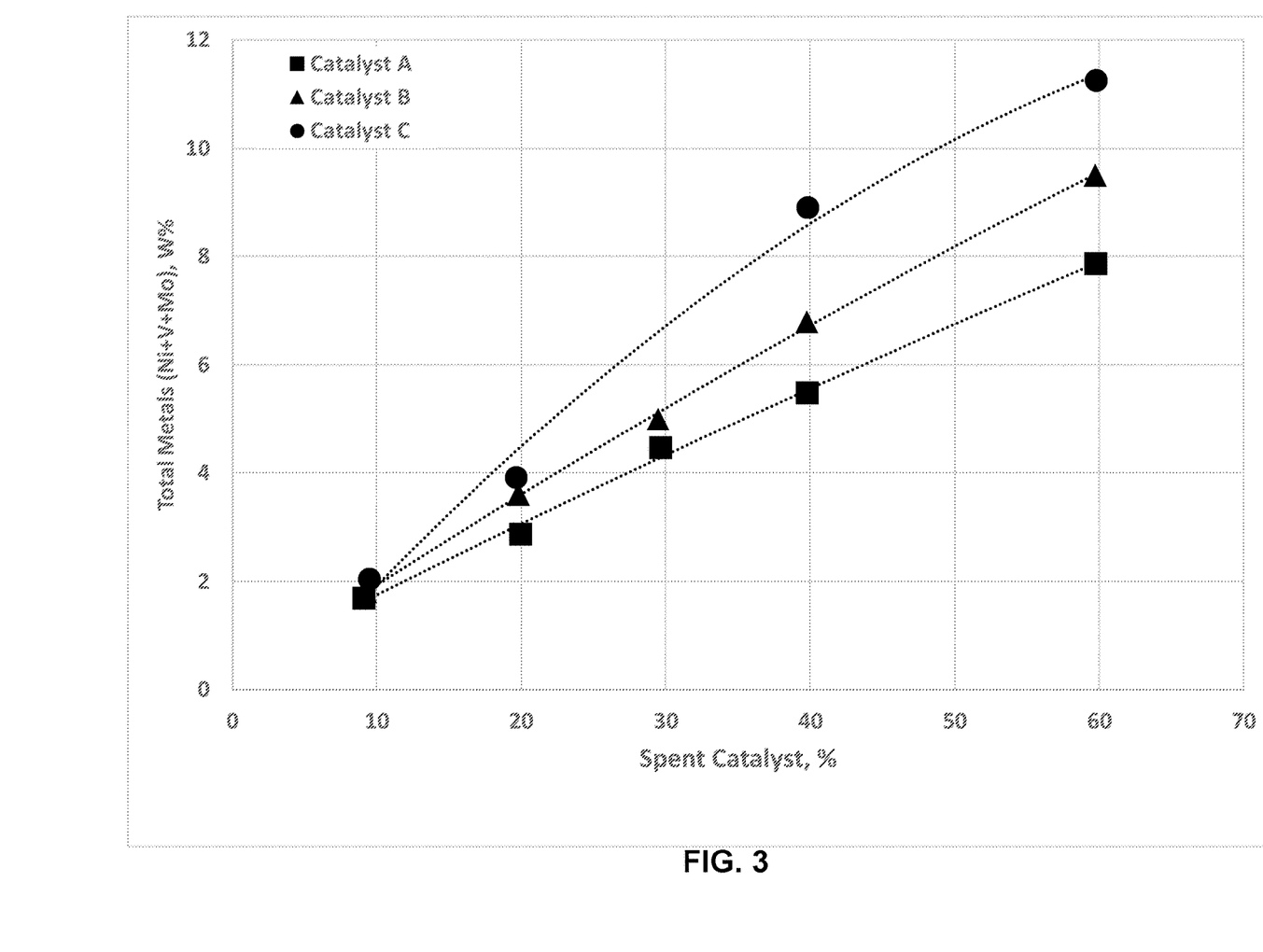
FIG. 3 shows the metal loadings for three types of catalysts A, B and C.

FIG. 3 illustrate the total metal (Ni+V+Mo) loadings for three exemplary types of suitable catalysts, namely catalysts A, B. and C. The X-axis is titled as % spent catalysts in a hydroprocessor reactor, such as reactor 100, while the y axis is titled as a weight percent (W %) of the total metals. As seen in the figures, when the catalyst is approaching to full spent catalyst, the metal load is increasing. With the catalyst basket 200 (e.g., a tubular catalyst basket), one sees more metal(s) loading in the catalyst material at the top of the catalyst basket 200 (where the inlet is located) and less in the bottom of the catalyst basket 200. This is not possible with the previous catalyst basket because the basket is short in height and this impact cannot be determined.

Figure 4:
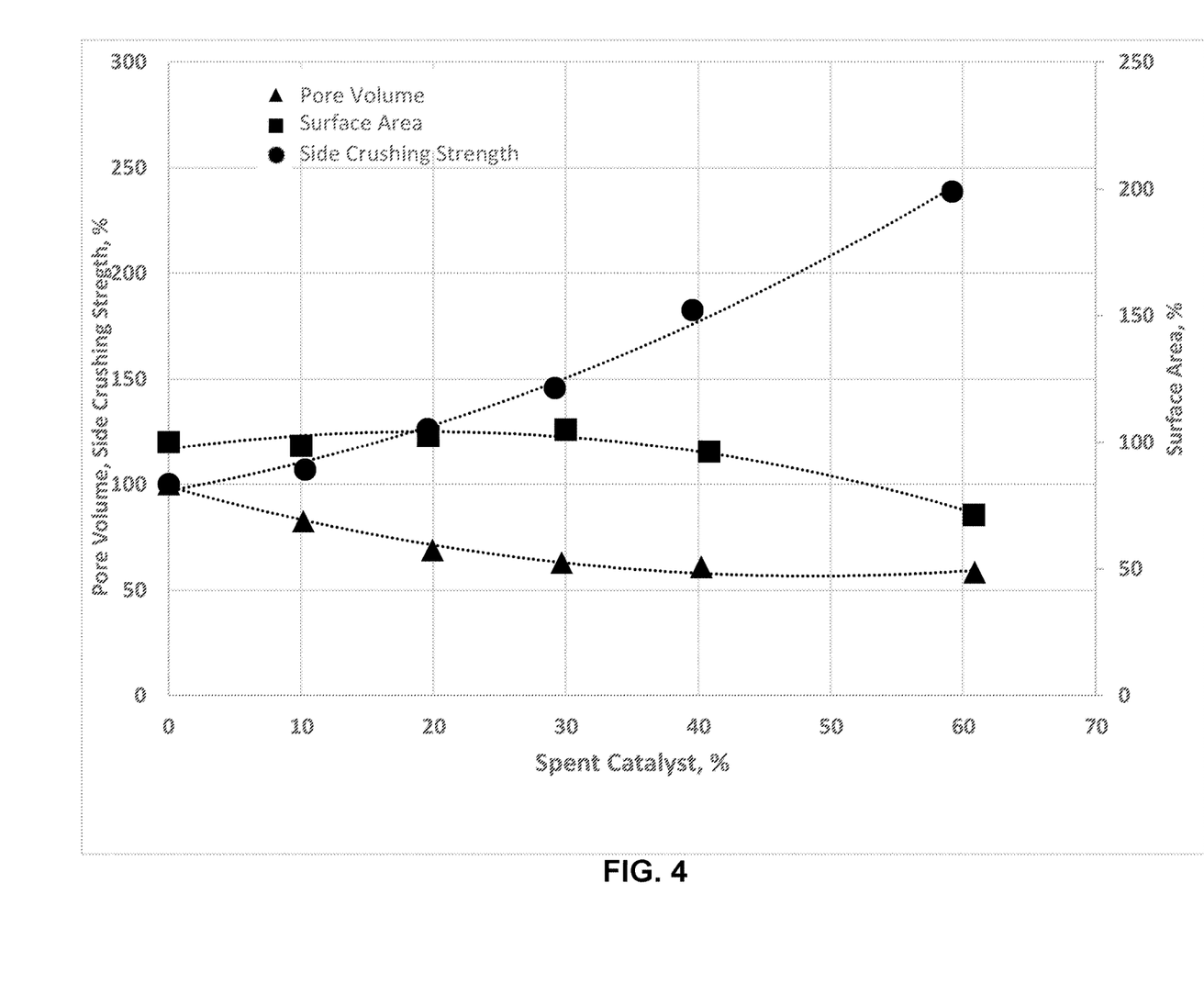
FIG. 4 shows the physical properties of one exemplary catalyst, and more particularly, shows the volume pore (---▲---); the surface area (---●---) and the side crushing strength (---■---).

FIG. 4 illustrate physical properties, namely, surface area, pore volume and side crushing strength of a single exemplary catalyst, (the values that are shown at identified as a percentage (%) only relative to the values at 0%). In FIG. 4, the legend ( ---▲--- ) depicts pore volume; the legend ( ---■--- ) depicts surface area and the legend ( ---●--- ) depicts the side crushing strength. When the catalyst is loaded with the metals (contaminants), there is a substantial decrease in surface area and pore volume. This determination is only possible with the elongated catalyst basket 20 of the present disclosure (e.g., a long elongated tubular catalyst basket) and not with Applicant's previous version of the catalyst basket. As the pores of the catalyst material is loaded with the metal, the catalyst particles (catalyst material) will become more stronger therefore the catalyst particles will have higher crushing strength.

FIGS. 3 and 4 have thus been provided to show the advantages obtained by use of the catalyst basket described herein. In particular, FIG. 3 shows the differences on catalyst loading between three exemplary catalysts (suitable for the intended application) as a function of spent catalyst percentage. FIG. 4 shows data for a single catalyst for three properties as a function of spent catalyst content. These figures illustrate the importance of taking into consideration metals loading and in accordance with the present disclosure, the need to have a longer basket to determine the metal loadings.

Any number of exemplary catalyst can be used with the present catalyst basket so long as they are suitable for the intended application. For example, suitable catalysts are described in Marafi et al. "Spent catalyst waste management: A review: Part I-Developments in hydroprocessing catalyst waste reduction and use." Resources, *Conservation and Recycling* 52.6 (2008): 859-873, which is hereby expressly incorporated by reference in its entirety.

Thus, in order to more accurately evaluate the metal loading of the catalyst, a long elongated catalyst basket 200 is used so that it extends along more of the catalyst bed relative to conventional basket design which only occupied a small area of the catalyst bed since the basket had a low height to (inner) diameter ratio.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for analyzing a catalyst in a catalytic reactor that operates under non-isothermal conditions comprising the steps of:
    positioning a catalyst basket within a catalyst bed within the catalytic reactor, the catalyst basket containing catalyst material the forms the catalyst bed,
    operating the catalytic reactor, the catalyst basket having dimensions such that a temperature difference ($\Delta T$) along an axial direction of the catalyst basket is non-isothermal; and
    analyzing the catalyst material contained within the catalyst basket.

2. The method of claim 1, wherein the temperature difference ($\Delta T$) is within a range of 1° C. to 40'C.

3. The method of claim 1, wherein the temperature difference ($\Delta T$) is within a range of 5° C. to 25° C.

4. The method of claim 1, wherein the catalyst bed has a height (h1) and an internal diameter (ID1) and the catalyst basket has a height (h2) and an internal diameter (ID2), wherein h2/ID2 is between 1 and 300, and wherein h2/h1 is between 0.05 and 1.

5. The method of claim 1, wherein the catalyst basket has an internal diameter of between about 1 cm to 25 cm, a height between 25 cm to 300 cm, and a wall thickness between 0.1 cm and 1 cm.

6. The method of claim 1, wherein the step of analyzing the catalyst material contained within the catalyst basket comprises the steps of recovering the catalyst material within the catalyst basket and testing the catalyst material to determine one of: catalyst selectivity, activity, and remaining catalyst life.

7. The method of claim 1, wherein the step of analyzing the catalyst material contained within the catalyst basket comprises the step of analyzing the catalyst material for physical properties and chemical composition.

8. The method of claim 1, wherein the step of analyzing the catalyst material contained within the catalyst basket comprises the step of determining a metal deposition profile of the catalyst material.

9. The method of claim 1, wherein the catalytic reactor comprises one of a hydrodesulfurization reactor, a hydronitrogenation reactor, hydrocracking reactor, a hydrogenation reactor and a hydrometallization reactor.

10. The method of claim 1, wherein the catalyst basket is formed of stainless steel mesh wire and has a tubular cylindrical shape.

11. The method of claim 4, wherein h2/h1 is between 0.1 and 1.

12. The method of claim 4, wherein h2/h1 is between 0.2 and 1.

13. The method of claim 4, wherein h2/h1 is between 0.3 and 1.

14. The method of claim 4, wherein h2/h1 is between 0.4 and 1.

15. The method of claim 4, wherein h2/h1 is between 0.5 and 1.

* * * * *